Nov. 26, 1968            T. R. WELCH            3,413,002

ELECTRICAL COMPETITIVE GAME

Filed Feb. 10, 1965                          9 Sheets-Sheet 1

INVENTOR.

Thomas Ross Welch

Nov. 26, 1968     T. R. WELCH     3,413,002

ELECTRICAL COMPETITIVE GAME

Filed Feb. 10, 1965     9 Sheets-Sheet 2

INVENTOR.

Thomas Ross Welch

Nov. 26, 1968  T. R. WELCH  3,413,002
ELECTRICAL COMPETITIVE GAME
Filed Feb. 10, 1965  9 Sheets-Sheet 7

Nov. 26, 1968    T. R. WELCH    3,413,002
ELECTRICAL COMPETITIVE GAME
Filed Feb. 10, 1965    9 Sheets-Sheet 8

INVENTOR.
Thomas Ross Welch

United States Patent Office 3,413,002
Patented Nov. 26, 1968

3,413,002
ELECTRICAL COMPETITIVE GAME
Thomas Ross Welch, 520 Moreno Ave.,
Los Angeles, Calif. 90049
Filed Feb. 10, 1965, Ser. No. 431,534
14 Claims. (Cl. 273—93)

ABSTRACT OF THE DISCLOSURE

A game consisting of two concealed veils each with opaque and transparent surface sections defining either an offensive or defensive team patterns. The veils are strategically movable with regard to one another. A chance mask with opaque and transparent surface sections or chance indicating markings is randomly partitioned and movable with regard to the veils, with light passing through the relative transparent surface sections providing an indication of the game's progress.

---

This invention relates to a new and improved game and method of playing the game.

One of the great disadvantages of previous games is the slowness of the action, resulting in part from the meticulous care that must be used in the monotonous activities: such as carefully moving the playing markers, counting squares in response to the spin of a dial, and other equally dull activities in attempts to get variation and chance into the game.

In these previous games, skill is usually restricted to the player's ability to accurately flip his finger against the number spinner. Previously games have incorporated the element of chance by a stack of cards that were placed face down and taken one at a time when directed by the spinner or by the position upon which the player's marker stopped.

This stack of cards can have but one set of odds governing the occurrence of an event and this is unalterable for any reason such as the type of play. This invention allows alteration to type of play as well as further alteration of odds of events occurring depending upon skill of player.

Without a method of altering the instructions in relation to the action very odd, funny and conflicting instructions can appear which delay and confuse the game.

In this invention chance is incorporated directly into the computer and the odds of occurrences can be varied in accordance with the skill of the operator.

One of the objects of this invention is to put the skill of the players as a main feature of the game.

Another object of this invention is to eliminate such monotonous activities as spinning spinners or wheels.

Another object of this invention is to speed up the activities of the game so that the resulting battle of wits becomes exciting and stimulating.

Another object of this invention is to give the players a great choice of potential moves against each other in the testing of their relative abilities.

Another object of this invention is to provide means of computing automatically the outcome of the game so as not to have monotonous activities to slow down the game.

Another object of this invention is to display automatically the result of the computation.

Another object of this invention is to simplify the move to the new position, indicated by the computation, so the next play and a new test of wits is ready to be waged without delay and loss of interest.

Another object of this invention is to give selections of plays and decisions of defensive moves very similar to the types of decisions and selections the team captains and players on actual games would have to make.

Another object of this invention is to introduce the element of chance into the game.

Another object of this invention is to make this element of chance vary in its odds of possible occurrence relative to the relationship of the settings of the game resulting from the decisions and skills of the players.

Another object of this invention is to make these elements of chance actually fit the type of play, or decision that was decided upon by the players.

Another object of this invention is to eliminate the monotonous details of counting squares or positions to move the markers or playing objects by instead displaying or indicating the computed gain or loss and/or direction directly on the field of play.

In accordance with these and other objects which will become apparent hereinafter, preferred forms of the invention will now be described with reference to the drawings, wherein:

FIGURES 19 (a–d) is a plan view of the slots in veils 230 and 240 illustrating their coincidence as follows:
FIGURE 19a for a long hit.
FIGURE 19b a miss.
FIGURE 19c a short hit.
FIGURE 19d a miss.

Figures 1, 3, 6, 14:
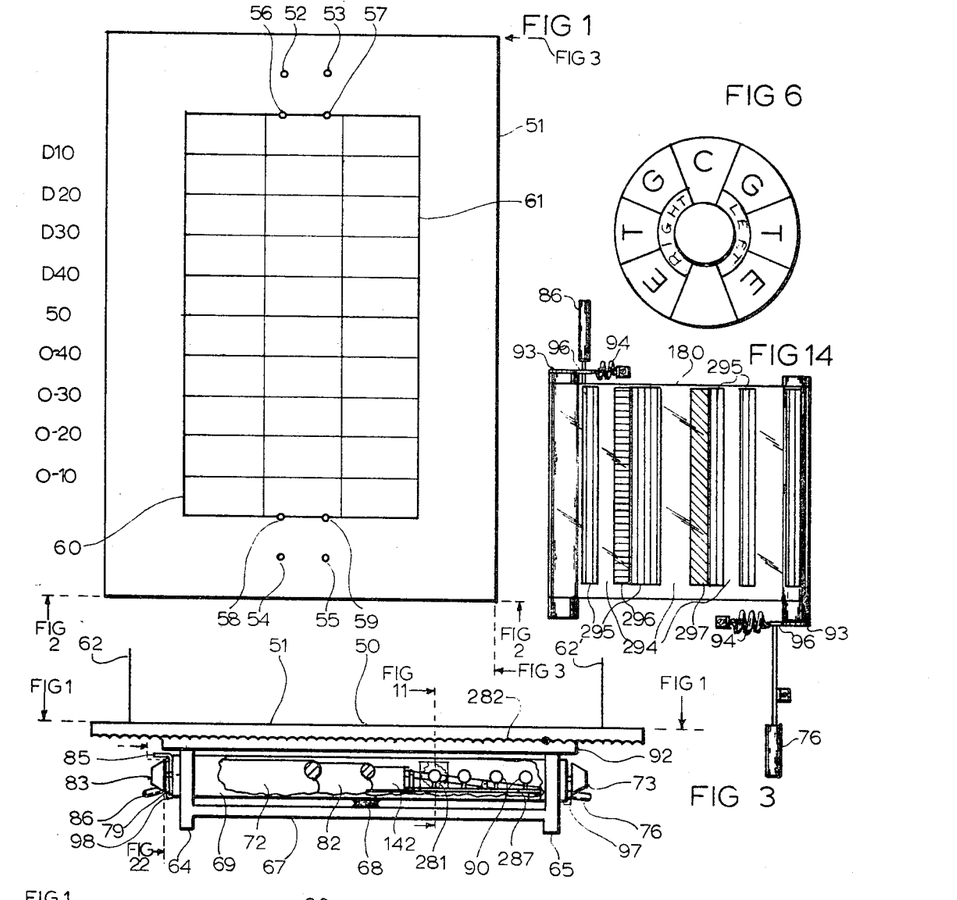
FIGURE 1 is a plan view of a football version of the game.
FIGURE 3 is a side elevational view of the football game partially cut away to show interior workings.
FIGURE 6 shows a close up of the dial for selecting plays on veils 70 and 80.
FIGURE 14 shows a plan view of veil 180 and means of moving this veil.

Referring in detail to the figures, FIGURE 1 shows a plan view of the football version of the game. The size of the playing area 51 is preferably but not necessarily patterned to scale to the regulation football field which is 60 yards wide by 120 yards long.

At each goal line are holes 52, 53, 54 and 55 to accept a set of poles 62 to represent goal posts. If the game is to be played to professional football rules the holes 56, 57, 58 and 59 would be used since the position of the goal posts in professional football are different.

Since the yard lines are commonly referred to by reference to the distance from the goal line these have been numbered from 10 to 50, prefixed by the letters "D" or "O" depending upon whether it is the Defensive or Offensive team's side. Therefore the numbers to 50 have been reserved for discussion of yardage on the field 51. Hereafter, in order to emphasize certain play terms, such as Offense, Defense, Field, Tackle, etc., and terms used to define significant elements of the game, the words used for these terms will appear with capital first letters.

Starting 10 yards from the goal line, top of FIGURE 1, lines are marked D10, D20, D30 and D40 to indicate Defense end of Field. The center line of the field is marked 50.

Starting 10 yards from the goal line, at the opposite end of the field the lines are marked O-10, O-20, O-30 and O-40, to indicate Offense end of Field.

As needed in the following description, the distances between the above lines will be represented by the numbers from 1 to 50, i.e., half way between D30 and D40 will be D35.

The side lines of the field are represented by 60 and 61.

Throughout this description I will refer to line positions such as Left Tackle, or Right End, since this is standard reference in football talk, I will continue to use it in that manner. For the purpose of clarity in this description I wish to standardize on one meaning, namely: that all reference to the Left Side is the Offensive's Side, shown on the drawings as Side Line 60. All drawings have been made so that to the observer Line 60 is at his left side.

All reference to Right Side is Offensive's Right Side, Side Line 61. The reason for this precaution is that the defensive sides are opposite of these, since he is facing the offensive player, and confusion can result without the above definition.

Figure 2:
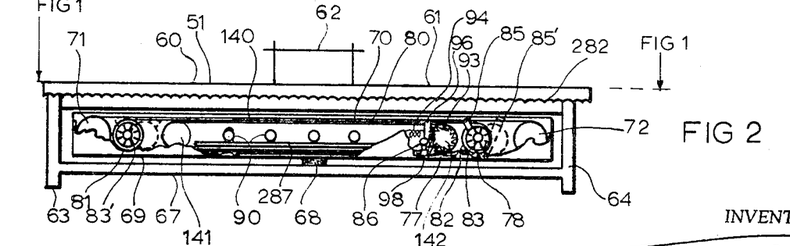
FIGURE 2 is an end elevation view of the football version of the game particularly cut away to show the inner workings.

FIGURE 2 shows an end elevation view of the game showing the goal posts 62 in the holes as previously described. The side lines 60 to the left and 61 to the right.

The playing area can be supported on four standards 63, 64, 65 and 66; 66 is behind 63 in FIGURE 2; 65 is shown in FIGURE 3.

These supports further connect to Base 67 which supports Bearing 68 provides rotation for Frame 69 which encloses Veils 70 and 80 with their associated Drums 71, 72 and 81 and 82. These carry the Veils in the form of a continuous loop with 70 overlaying 80 in such a manner that light from light source or sources 90 will go through the sections not opaque in Veil 80 and 70, thereby displaying a beam or path or slot of light on Field 51, where transparent sections in both 70 and 80 coincide.

The lights 90 and other elements such as pivots for Levers 76 are mounted to Shelf 287, which extends below the top layers of veils 70, 80 and 140 as shown in FIGURES 2 and 3.

This shelf can be mounted to enclosure 69 at points beyond the edges of the veils.

The choice of the word "veil" to describe the moving portions has been chosen because the dictionary defines "Veils"—

"Something hung up or spread out to intercept the view; a screen, a curtain; figuratively, anything that prevents observation; a covering, mask, disguise, or the like."

This definition will support the broad meaning as intended in the description of this invention.

The words "Playing Object" have been selected as broader than ball, such as would be used in such games as football and baseball. It is the intention that the teachings of this invention can be applied to other games involving ships, airplanes, humans, animals, and other "playing objects"; where maneuvers and decisions of opposing players can be programmed onto the veils in the manner taught in this invention disclosure.

In the following description for the sake of clarity definite statements will be made relative to yards of gain under conditions of alignment of the Veils. Even though these definite statements are made it will be obvious that varying the veil's patterns can change these values over a considerable range without changing the basic concepts of the game and this invention. The same is true in regard to the element of chance introduced along with odds in relation to the alignment of the veils and also the type of play. Where definite statements are made such as odds of 2 to 1 or 4 to 1, these can be greater or less without changing the basic concept of the invention.

In this description the word "slot" has been used as the narrow, elongated, line indicating the trail of the player, or ball, or playing object, since the dictionary meaning actually defines "slot" as a "track" or "trail."

FIGURE 3 shows a side view of the game with Cabinet 69 partially cut away to reveal the internal elements such as Lights 90, Drums 72, 82 and 142.

The Dials 73 and 83 are shown with details of the indicia of these dials shown in FIGURE 6.

Figures 17, 22:
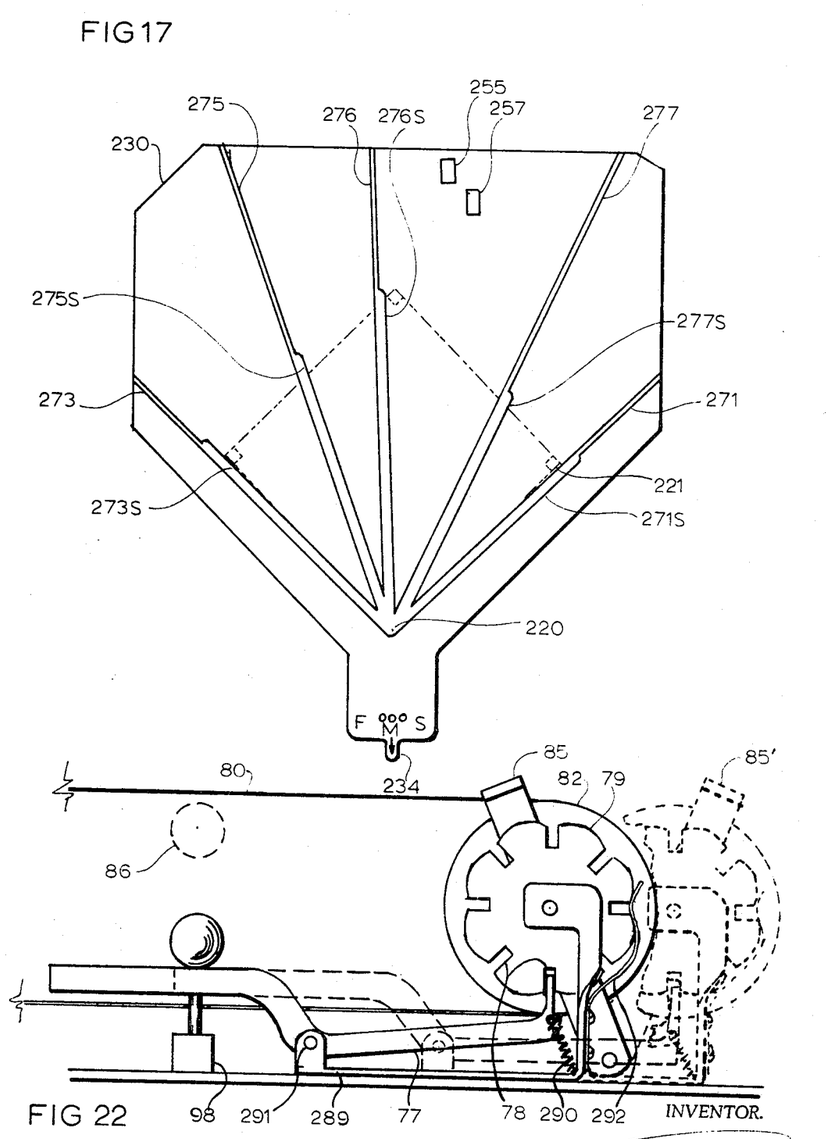
FIGURE 17 shows a plan view of veil 230 of the baseball game version. This is the batter's veil.
FIGURE 22 is an end view detail of an indexing means, the drum locking means, and the veil shifting means for veil 80.

Lever 85 is shown in side view in FIGURE 3 and in end view in FIGURE 2. The position 85' is shown in dotted line with the drums. The drums 81 and 82 are also shown in dotted line when in the shifted position when lever 85 is in the 85' position. This shifting moves Veil 80 to the new position as will be described. A detail view of the lever, drums, lock, detent and shifting means is shown in FIGURE 22. The detents 282 in FIGURES 2 and 3 allow the Field 51 to be placed on the base in order to position the playing area over the line of scrimmage.

Figure 4:
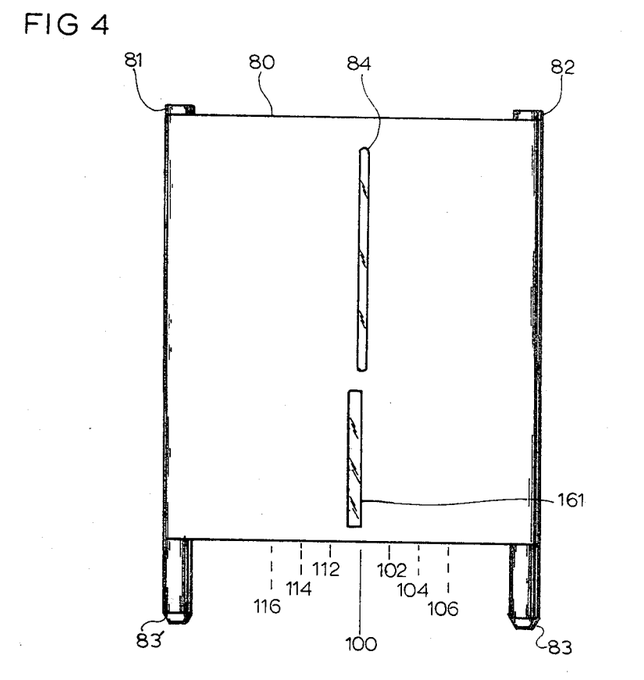
FIGURE 4 is a plan view of veil 80 of the football game version. This is the offensive player's veil and also shows his operating dials and drums.

FIGURE 4 shows the top view of the veil 80. All portions of this veil are opaque except the Slot 84 and the Window 161, which are transparent.

FIGURE 4 also shows the Drums 81 and 82 that are rotated by Dials 83 and 83' for the purpose of moving the transparent sections 84 and 161, to the right or left, by the player, in the selection of positions at which the next play is going to occur.

For this purpose Dials 83 and 83' are marked in a manner as shown in FIGURE 6 representing the positions, G-Guard, T-Tackles, and E-End for the right and left sides, and C-Center.

These positions to the right and left of the ball positions are represented in FIGURES 4 as Guard, Tackle and End on the right respectively by even numbers 102, 104 and 106 and the same positions on the left by even numbers 112, 114, 116 respectively. Center by number 100.

Dials 83 and 83' are preferably controlled by Detents, such as shown in FIGURE 22, so that the placing of 84 is always on one of the even number lines 100, 102, 104, 106, 112, 114, 116 when the play is a "run."

When Level 85 is shifted to position 85' the Drums 81 and 82 are shifted to the dotted position shown in FIG- He adjusts Knob 83 to "E" Right which would set Slot 84 to Line 106.

Assume defensive player decides, "Opponent will not again risk a right end run, but will try left," so he sets his dial to "Left" or 200 opposite Line 114.

Figures 7, 8, 9:
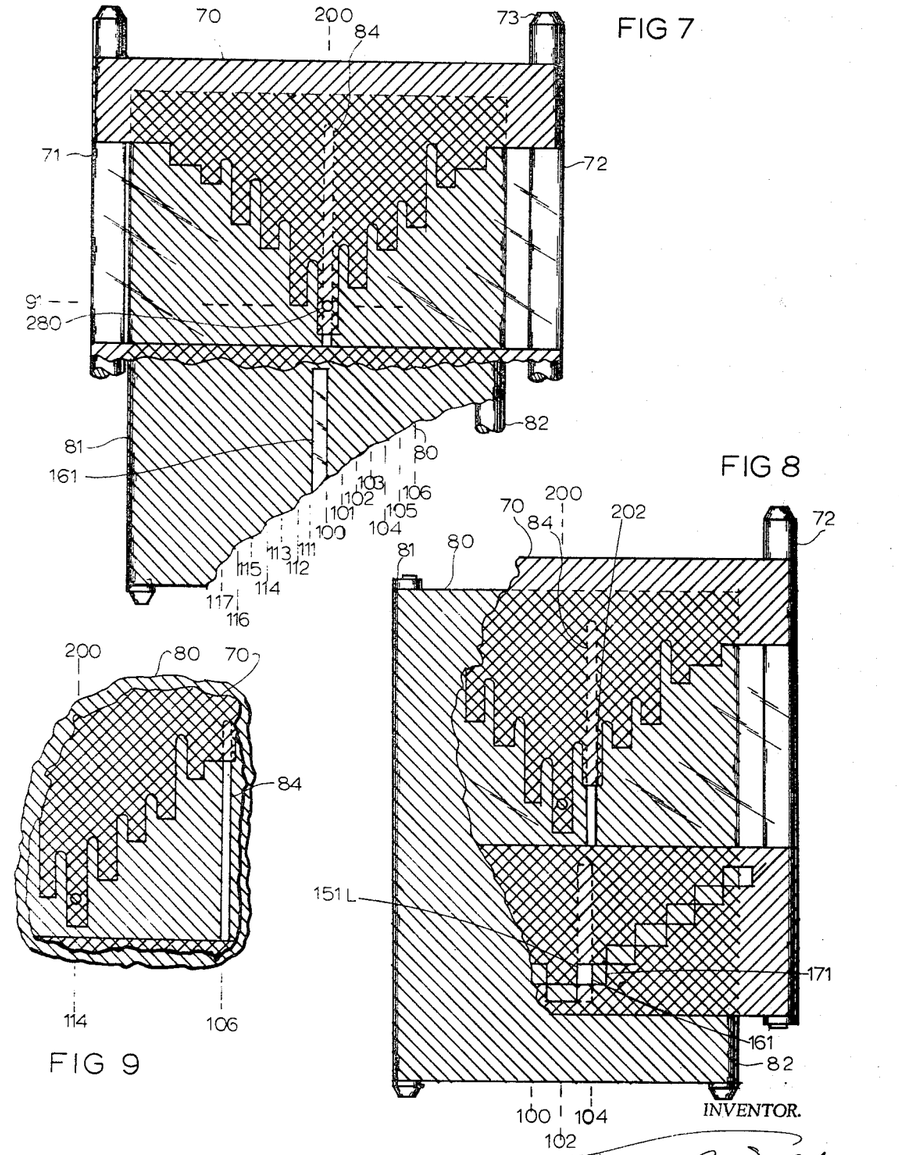
FIGURE 7 shows the plan view of veils 70 and 80 in assembly and in particular shows the veils set for setting the fields at the scrimmage point.
FIGURE 8 is a plan view of the relationship of veils 70 and 80 for a play.
FIGURE 9 is a plan view showing settings of veils 70 and 80 for another play.

The resulting placement is shown in FIGURE 9. Obviously the defensive player had his defense on the wrong side of the scrimmage point and therefore the offense ball carrier carried the ball a great distance as shown by the slot in FIGURE 9.

The gain from this play was more than the necessary yardage to make the next play a first down.

Again the playing area is adjusted to the new position of the ball as previously described and the game is ready for the next play.

For further illustration we will have the offensive player select the next play as a pass.

He first shifts Lever 85 to 85' as shown dotted in FIGURES 2 and 22, which shifts the relative position of these transparent areas 84 and 161 of veil 80 to the odd positions 101, 103, 105, 107, 111, 113, 115 or 117 as previously explained.

Assuming offense player chooses a pass over left end. He sets Knob 83 to "E Left" which lines up Slot 84 with Slot 215 as shown in FIGURE 10.

The defense player can now choose any one of his team positions and it will be an even clearer description if the results of several of these choices are described.

Figures 10, 10A, 10B, 10C, 10E, 10F, 10G:
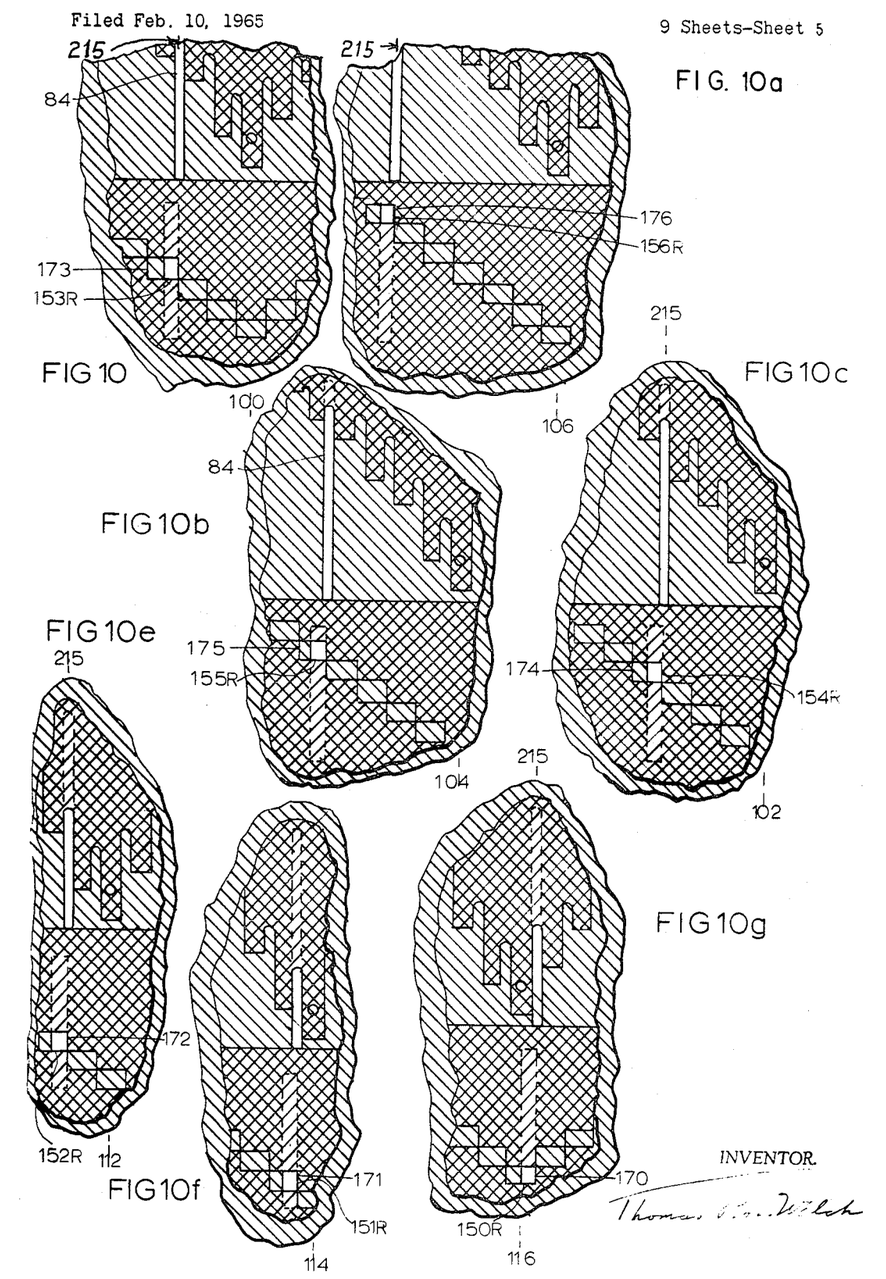
FIGURE 10, 10a, 10b, 10c, 10e, 10f and 10g are additional plan views of other settings of veils 70 and 80 for a series of plays and illustrate the change in gain in relation to defense player's ability to guess offense player's point of attack. Cutaways remove everything but essential portions to descriptions and views.

If defense decides the pass will be over the offense "Right End" he would set his Line 200 over Line 106, by Dial 73 setting on "E Left." See FIGURE 10a. The result would be a possible completed pass for 55 yards.

Note the word "possible." The arrangement to indicate complete, incomplete and intercepted passes will be explained once this portion of the description is complete.

If defense had chosen dial setting "Right Tackle" his line 200 would be over 104 with an Advance of 47 yards, see FIGURE 10b.

FIGURE 10c shows the possible advance of 45 yards if he had chosen dial setting to defend over Right Guard, line 200 over 102.

The next setting of his dial would be "C" or Center, which would be a possible gain of 42 yards as already shown in FIGURE 10.

FIGURE 10e shows even more restricted gain if defense had chosen dial setting LEFT GUARD position.

FIGURE 10f shows the very limited possible gain if defense dial setting LEFT TACKLE had been chosen.

FIGURE 10g shows the possible gain by offense, when defense chose dial setting Left End, which is where offense had chosen to attack. By changing the shape of pattern 202 in Veil 70 an actual loss could be indicated.

This then shows typical possible advances from passes and also shows how these results vary with the ability of the defense to place his defense concentration point on the offense point of attack.

In addition to the possible advance distance variation there are several other possible happenings to this play as a result of the ability to concentrate defense point on offense point. These are (1) a completed pass, (2) an incomplete pass (3) a blocked (pass or tackle) behind the line of scrimmage (4) an intercepted pass.

It is preferable to have stimulation in the game of some element of chance; also it is desirable that rather than pure random chance, that the odds be varied in relation to the ability of defense to place his defense at the opponent's point of offense. In the real game of football a blocked kick or an incomplete pass is much more likely if the defense guesses the offense's point of attack.

An important part of the invention is the computer of this game which displays along with other information the results of whether the pass was (1) complete, (2) incomplete, (3) blocked or (4) intercepted, and varies the odds in relation to the relationship of the points of attack.

Figure 13:
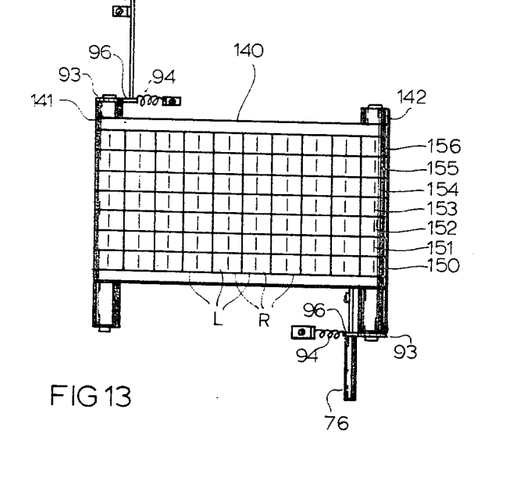
FIGURE 13 shows a plan view of veil 140 and also shows means of moving this veil.

This is accomplished in one form in the new and improved manner in this invention as follows:

Veil 140 as shown in FIGURE 13, is positioned inside Veil 70 and 80 on Drums 141 and 142. See FIGURE 2. This Veil 140 need extend only part way into the Veils 70 and 80 since its readout area is confined to the offensive end of the field, except for one version which will be described later. This veil must be kept shorter than the line 288 of Veil 70; otherwise any opaque areas will block the clear areas of Veil 70.

This veil carries a pattern that is shown in FIGURE 13. It consists of horizontal lines of indicia indicating the nomenclature, (1) complete, (2) incomplete, (3) blocked, and (4) intercepted, with the ratio between complete and other conditions stated above varying with each horizontal line.

This indicia is further divided by each vertical setting into left side and right side with the result that Window 161 in Veil 80 will allow the left side of the indicia to be read when Lever 85 is in position 85 for running plays. Therefore, all indicia on left side of each vertical line can be for running plays.

When Lever 85 is shifted to position 85', for passing or picking plays, Window 161 now shows only right hand portion of lines of indicia in Veil 140 and therefore this indicia can pertain to passing or running plays.

For the sake of illustration the following ratios have been selected; however, the invention is in no manner confined to these ratios or odds.

CHART NO. 1

| Odds line | Approximate ratios | | | | Penalty plays | | | |
| --- | --- | --- | --- | --- | --- | --- | --- | --- |
| | Complete | Incomplete | Blocked | Intercepted | Against offensive | | Against defensive | |
| | | | | | Off sides | Clipping | Off sides | Clipping |
| 156 | 6 | 1 | 0 | 0 | 1 | 0 | 2 | 2 |
| 155 | 5 | 2 | 0 | 0 | 1 | 1 | 2 | 2 |
| 154 | 4 | 3 | 1 | 1 | 2 | 2 | 1 | 2 |
| 153 | 3 | 4 | 1 | 1 | 2 | 3 | 1 | 1 |
| 152 | 2 | 5 | 2 | 1 | 2 | 2 | 1 | 1 |
| 151 | 1 | 6 | 3 | 2 | 1 | 1 | 1 | 1 |
| 150 | 1 | 7 | 4 | 3 | 2 | 2 | 0 | 0 |

The respective lines of indicia on Veil 140, consisting of Lines 150, 151, 152, 153, 154, 155 and 156 "L" (Left) or "R" (Right) will appear through Clear Area 161, when Veil 80 is set by Lever 85, at 85 for Left and 85' for Right.

These lines of indicia will appear through Clear Area 170, 171 or 171', 172 or 172', 173 or 173', 174 or 174', 175 or 175', 176 or 176' in Veil 70 when these Clear Areas are lined up as follows.

Note that Line 150L and Clear Areas 161L and 170 line up when the points of attack are the closest together, actually coincide.

Line 151L and Clear Areas 161L and 171 or 171', line up when points of attack are a little further apart. This continues for Lines 152 and the rest until when 156L and 161L and 176 or 176' line up, the points of attack are at least 6 positions apart. The same is true for right hand settings where 151R, 161R and 171 or 171', line up. Clear Area 176 can extend to the left a greater distance and 176', to the right a greater distance to cause Odds Line 156 to read whenever the points of attack were 6 positions apart or greater.

URES 2 and 22, thereby placing slot 84 in a new position half way between the above even number lines, to what has been termed the "odd position lines" 101, 103, 105 on the right or lines 111, 113, or 115 on the left. These are midway between the consecutive even numbers previously mentioned and are shown in detail in FIGURE 7.

The reason for this change in position, which will in general be referred to as even numbers for running plays or odd number for passes or kicks, will be explained in detail as this description progresses.

Figure 5:
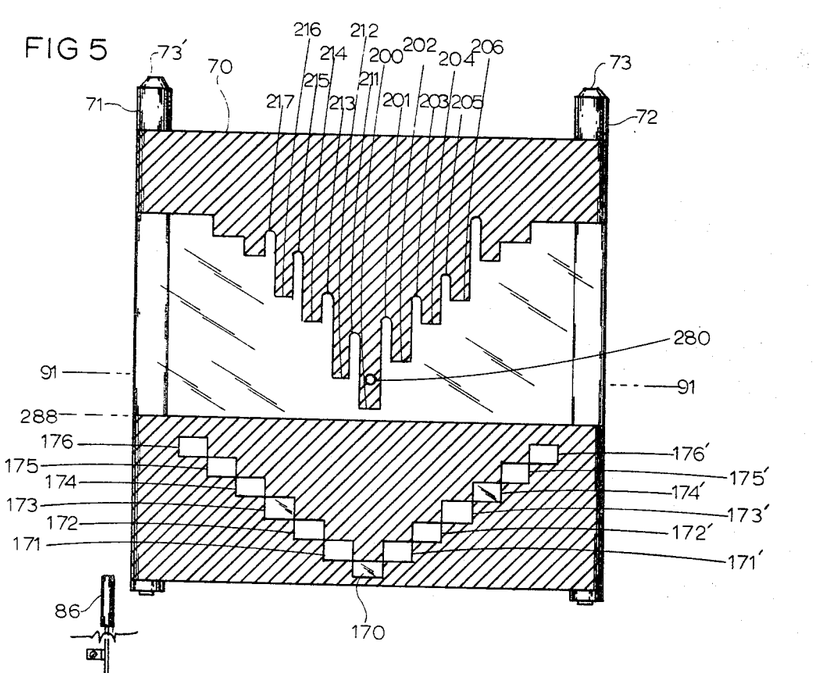
FIGURE 5 is a plan view of veil 70 of the football game version. This is the defensive player's veil. The view also shows the player's dials and drums.

The same relative even and odd positions are shown in FIGURE 5 which shows the Top View of the Veil 70 for the defensive side, with opaque portions 200 for center position and 202, 204 and 206 indicating corresponding even positions on the side of the ball as previously indicated by even lines 102, 104 and 106 of FIGURE 4 when the Veil 70 center position 200 is set on the playing object position 100. At this time the left side even number positions 212, 214 and 216 also correspond to 112, 114, and 116. The odd numbers 201, 203, 205 and 211, 213, 215 also line up respectively with 101, 103, 105 and 111, 113 and 115. When the veils are set as shown in FIGURE 7 the numbers line up as follows: 100 and 200, 101 and 102 and so forth.

The opaque portions of Veil 70 are shown by the diagonal line from bottom left to top right.

The Knobs 73 and 73' are used to place the Veil 70 in the above increments to right or left, preferably controlled by detents.

The Knobs 73 and 73' are similarly marked as shown in FIGURE 6. These positions will move Veil 70 to the even positions. Center 200 can be moved to the right (its left) in relation to the ball positions 100, 102, 104, 106 or 108, or to the left to positions 112, 114, 116 or 118.

I wish to point out that the results of the relationship of the two veils with the ball or playing object position and with each other is one of the basic elements of the game. The advantage of this numbering system will become apparent in the following description of the game.

Prior games had to be divided into arbitrary steps or squares, that were laboriously counted out as the "men" or playing object or objects were moved from square to square.

This game has eliminated the steps or squares as well as the counting. The player's move is in response to visual instructions that actually display the total move length and direction without the monotonous counting of step by step moves.

Such markings as do occur in this invention are related to the actual yardage markings of the field. They are used primarily to measure the advantage of one player over the other after the playing object has been moved in relation to the visual instructions.

The two Veils 70 and 80 when lined up over the scrimmage line are overlapped with each other as shown in FIGURE 7; this also shows lines 100, 200 and Slot 84 lined up vertically, which lines up all other corresponding vertical lines as just described. Note that Circle 280 and Slot 84 are lined up.

The opaque portion of Veil 80 is shown in FIGURE 7 by diagonal lines from top left to lower right. The opaque portion of Veil 70 is shown by diagonal lines from lower left to top right. Where both veils are opaque the lines cross at 90° angles.

These diagonal lines are used rather than solid black in order that the relation of the two veils in this and future figures can be shown in order to better describe the invention. Actual opaque, black areas would hide the inter-relation of the two veils.

For the further sake of clarity the opaque and transparent portions only will be considered in this description with the light transmitting through the transparent areas. Later it will be shown that colored areas can be used and also reflected light can be used.

Horizontal line 91 indicates the position of the ball on the scrimmage line. The actual ball or playing object location is indicated by Circle 280 as shown in FIGURE 7.

To describe the operation of the game, I will first describe a standard running play.

Assume it is 1st down and 10 yards to go. The opposing players are seated opposite each other, at the ends of the Field 51, next to the Goal Posts 62.

The Line 91, FIGURE 7, and lines 100, 200 and 84 are lined up on the ball position.

Either player can make the first move, or both together. At this point the action is similar to the huddle of a football team making the decision of the type and direction of play to be made.

Assume the offensive player decides to run around right tackle.

With the Lever 85 in the "run" position 85, he adjusts knob 83 to "T Right."

This shifts transparent Slot 84 to position 104. This shift of position is done in secret and it is important that no indication of direction or distance of movement be indicated to the opponent.

The defensive player now wants to defend against the offensive play by his opponent. He will try to determine the direction of the opponent's play from the logic of the position of the ball on the field, the yards to the goal or a first down and the former plays, and other pertinent data.

Assume he determines the play will be a run around the offensive's right guard. He then rotates his Knob 83 to G Left (opponent's right) which makes the Center 200 of his Veil line up with Line 102.

The corresponding positions of the two veils are shown in FIGURE 8. Note the number 100, for the purpose of description, always stays on the old playing object position and the other numbers 102 to 117 remain in relation to 100.

Figure 12:
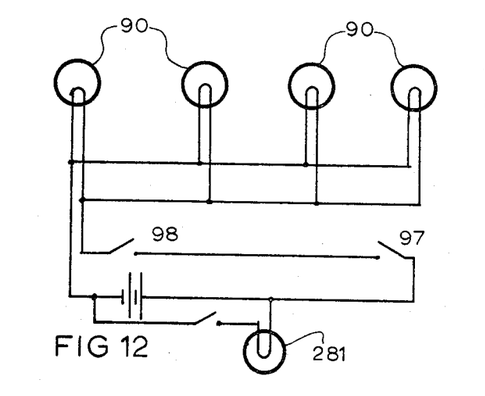
FIGURE 12 shows and is a schematic of circuit in football game version.

After the two players have selected their moves, when they each press their respective Levers 76 and 86, which actuate Switches 97 and 98 (see FIGURE 12), and lock the dials as shown in FIGURE 22. These switches being in series with Lights 90 must both be operated to turn on Light 90. The result of the player's selection of dial positions is displayed by the light slot of Line 84 extending until it meets opaque portion 202 of Veil 70. See FIGURE 8. This indicates a gain of 5 yards.

The playing object 283 is placed at this new position indicated by the end of the Slot 84. The relative position of the veils is adjusted back to the computer initial position, knob position C, to position 200, 280 and 84.

Figure 11:
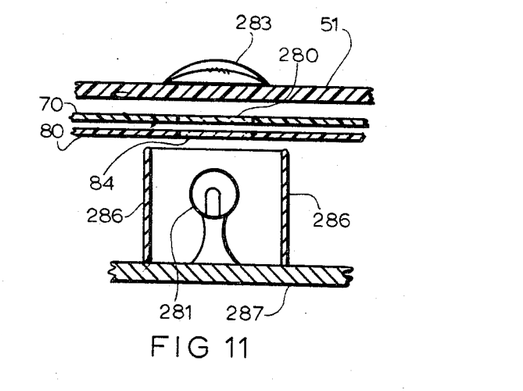
FIGURE 11 shows light and veils for for setting at point of scrimmage as shown in FIGURE 7.

Playing object positions 91 and 100 have both changed so the field is adjusted on Detents 282 until playing object 283 corresponds to the lineup on 280 and 84 as shown in FIGURES 7 and 11. The players are now ready for the next play.

When a football marker is used as the playing object, as shown in FIGURE 11, the football marker 283 can be a translucent, or frosted material of plastic, or the like, that will glow when the subject beam of light from light 281 hits it. This will indicate when the new setting has been reached with the computer set at the initial point, dial settings C.

This arrangement is shown in FIGURE 11, with the playing object 283 on Field 51 and the Light 281 mounted on Base 287. Barriers 286 confine the light to a small area so that when Veil 80 has Slot 84 in proper position and when Veil 70 has Circle 280 in proper position the light from light source 281 will pass through 84 and 280 and 51 to cause playing object 283 to glow.

Assume again offensive player decides to run around right, this time right end.

The explanation will be clearer if we describe this action in relation to the previously described plays shown in FIGURE 10.

Again, if offense sets Slot 84 to Line 115 (Veil 80 Line 215) as previously described and shown in FIGURE 10.

If defense sets his Line 200 on Line 106 (see FIGURE 10a) the attacks are 6 positions apart, and therefore the Odds Line 156′R in Veil 140 lines up with 161R in Veil 80 since Veil 80 is set at 85′ which lines up with 176 in Veil 70. The indicia of Line 156R will now show through to the players when the Lights 90 come on, displaying the resultant of the settings.

By reference to the Chart I, the odds of "Complete" showing in this window is 6-to-1 for attacks set 6 positions apart. The chances of penalties can be as shown.

If defense had chosen Right Tackle 104, FIGURE 10b, the points of attack would have been 5 positions apart, line 155R would show through Windows 161R and 175. The odds would be as shown for line 155 in the Chart.

FIGURE 10c shows the defense over Right Guard, at Line 102, 4 positions apart and in addition to the possible gain of 45 yards since Line 154R shows through Window 161 and 174 the odds of the play being complete are 4-to-3 as per the Chart.

Note in these explanations if offense had chosen Right Side and defense left side the corresponding windows in Veil 70 would have been numbers 170 through 176′ instead of 170 through 176 as in these illustrations.

FIGURE 10 shows the advance possible with defense over center, line 100, and Odds Line 153R showing through 173 and 161R.

FIGURE 10e shows the defense over Left Guard, Line 112 with Odds Line 152R shown through 172 and 161.

FIGURE 10f shows defense over Left Tackle, Odds Line 151R shows through 161 and 171.

FIGURE 10g shows the settings and the greater odds of interception as shown in Line 150 through Window 161R and 170.

Although Slot 161 is only one slot, I have termed it 161L to indicate its left setting in response to Lever 85 and 161R for the Lever 85 at position 85′.

Here then is a game where skill is the fundamental factor to winning, but chance enters into the result; the odds of chance vary in relation to the skill and though all of the happenings are so fast and the results of each play displayed so quickly the game is fast, skillful, fun, and even exciting.

The detail of the actual playing would occur as follows:

At the start of the game, after it was determined who would kick off, that player would take the Offensive Side of the Game.

The playing area 51 would be positioned to place the ball on the 20-yard line, Line 0–20. This is accomplished by shifting the playing area 51 in the Detents 282 on the top frame 92, which is fastened to Posts 63. Matching Detents 282 are provided in 51 and 92 to aid in positioning.

The Handles 76 and 86 are placed in up position which unlocks the Dials 73 and 83 by the action as shown in FIGURE 22, of Levers 77 being released from the Grooves 78 in Sub-Dial Wheels 79, when the pressure of respective Handles 76 or 86 is removed from its respective lever.

FIGURE 22 shows the detent and locking method as applied to Veil 80 and Drum 82. Easy adaption can be made to other veils as they are identical; also since the other veils do not shift position, Bracket 289 need not shift.

In FIGURE 22 Dial 83 has been removed to reveal Bracket 289 supporting Pivot 291 and Drum 82. Detent Spring 292 also mounts on this bracket and fits into detents in Wheel 79 which is directly connected by the Shaft with Drum 82. This spring action lines up Grooves 78 with end of Lever 77 so that when Lever 86 is placed in the "down" position Lever 77 is actuated into Groove 78 thereby locking Dial 82.

When Handle 85 is shifted to 85′, as shown by dotted lines, the Bracket 289 is shifted with the assembly to this new placement. This position detents and locks in the same manner except that Lever 86 now strikes Lever 77 in location 86″ because 77 has moved with Bracket 289.

When Lever 86 is "down" switch 98 is operated.

After a play when Lever 86 is again raised, pressure is removed from 77 and Spring 290 pulls end of 77 from Groove 78, as shown by dot dash lines, so that Drum 82 can again be positioned by Dial 83 to position Veil 80.

For clarity FIGURE 22 does not show the elements 96, 93 and 94 which operate Drum 142 by the action of Lever 86. These details are shown in enlarged scale in FIGURE 23 and in total assembly in FIGURE 2.

To continue with the description of the game, Lever 85 is thrown to pick position 85′.

Kickoff player selects the position he will direct his players during the kick by adjusting Knob 83 as previously described.

When offensive has made his selection he moves Handle 86 to "down" position which locks his Veil and actuates Switch 98.

Defense trys to set his point of defense on same line as offense' attack. When he makes his selection on Knob 73 he puts Handle 76 down. This locks his veil as just described and turns on the Lights 90 by actuating switches 97 which completes the circuit through Switch 98 to Lights 90.

Consider that Offense is selected to kick over Right tackle and defense played over Left tackle.

Slit 84 is set over 113 and 200 over 104.

When Levers 76 and 86 are moved to "down" position, the Lights 90 light up Slot 84 going 35 yards in Slit 217.

In addition light comes through Slot 164 and 174 to reveal one of the indicia on Strip 154 of Veil 140.

This strip would display one of the indicia. If "complete" shows through, yardage gain is okay.

Depending upon the indicia showing from 154 through Windows 164 and 174, the Playing Area 51 would now be adjusted to the new ball position.

After the kickoff just described the offensive changes sides and this can be accomplished by rotating the Frame 69 on Bearing 68. The positioning of Posts 63, 64, 65 and 66 is sufficient to allow 69 to rotate.

The initial point of the computer is located under the playing object position by adjusting the Playing Area 51 to this location as previously described. Now the new offensive player is ready for his first play.

It is first down with 10 yards to go to a new first down.

Offensive raises Lever 86 and computer lights go out. Veil 140 is progressed by this action as explained for FIGURE 23.

Offense selects type of play with Handle 85 and position of play with Knob 83.

Defense raises Lever 76 and selects position of defense with Knob 73. Lifting 76 also progresses Veil 140. When both players have finished their selection they move Handles 76 and 86 to "down," which locks the veils and lights the computer showing the result of the play.

The actual play selection details have been described earlier.

Depending upon the gain shown and the nomenclature showing from Veil 140 the playing object will be given a new position. Playing Area 51 will be adjusted to this new position and the next play will be made by the players.

If the offensive makes enough gain in four plays to total ten years (scale yards on Field 51) he receives a new set of four plays.

The rules can be like football rules which further provide that if he didn't make 10 yards he looses the ball (Offense). Then Frame 69 is rotated so that the new Offense player can make his selections.

The player can select a kick play on one of his plays which makes him more yardage but transfers the offensive to his opponent for the next play.

On such a kick play the offense can try for a field goal. If the path of Light 84, goes between the goals the goal has been completed; if confirmed by nomenclature showing from Mask 140. These scores are called Field Goals, which are 3 points.

Additional scores are made by running or passing the ball over the opponent's goal line. These are called Goals and are 6 points.

This provides an opportunity for a conversion from the opponent's 20 yard line which consists of either running the ball over the Goal Line for two points or kicking between the goal posts (Line 84 between posts), for an additional one point.

The person with the most points at the end of the game is the Winner.

These rules are flexible. They can be to the current Football Rules, college or professional, or rules can be adapted to suit the fancy of the players.

The display of indicia from Veil 140 is intended to be random with the additional variation of the odds varying as to which of Lines 150, 151, 153, 154, 155 or 156 are showing. Also as previously explained the nomenclature is keyed to the type of play by being in left or right hand columns for running or pass and kick plays.

Figure 23:
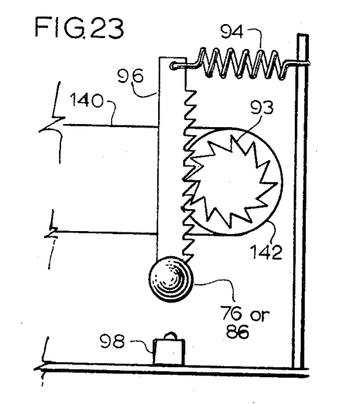
FIGURE 23 is an end view detail of a random selecting means for progressing such veils as 140, 180 and 250 and others as needed.

The method of random progression of Veil 140 is shown in FIGURE 23 whereas Lever 76 is raised Pawl 96 is pulled into engagement with Teeth 93 by Spring 94 and Drum 142 is rotated changing the position of Mask 140. The amount of rotation will depend upon the excursion of Handle 76 and the engagement of 96 and 93. The amount of rotation can be made to vary more if desired as will be explained. The second element of Random selection is the placement of the nomenclature on Veil 140. Since this follows no set pattern, except as to odds of occurrence, it would be virtually impossible for a player to memorize the recurrence of the nomenclature. Third, since the position of the Windows 170, 171, 172, 173, 174, 175 and 176 or 171', 172', 173', 174', 175' and 176' varies in relation to the setting of Veil 140 and Veil 80, at the setting of the defense player, and the setting of Window 161 varies in relation to the Veil 140, and Veil 80 at the setting of Window 161 varies in relation to the Veil 140, and Veil 80 at the setting of offense player, and since a further variation occurs by offense selecting 161L or 161R for run or pass, and since neither of these relative settings are known before hand, or by each other, and since further which windows are going to coincide because of the relative settings of Veils 70 and 80 to each other, to show a particular line of nomenclature, is also a variable; it can be seen that the nomenclature readout is quite random.

A further type of variation of travel of Veil 140 could be obtained by having Lever 86 also operate Veil 140 as shown in FIGURE 13 by actuating Drum 140 with a similar Pawl 96, Teeth 93 and Spring 94 as previously described.

If both players raised their Handles 76 and 86 at the same time the Veil 140 would travel the minimum amount. If one player raised his when the other was half raised, the second player would actuate the Drum 50 percent further.

If after one player had finished, the other player would raise his handle, Veil 140 were to be moved twice as far. All of the variations in-between are available.

Detents such as shown in FIGURE 22, are provided for Veils 140, 70, 180 and 80 to keep the sections of nomenclature in the Windows.

A simple version of the game would be as shown in FIGURE 14 where Veil 140 is replaced with Veil 180. Veil 180 can be progressed by rotating the drums in the same manner as described to operate 140 in order to take a position in a random manner.

It could have strips or slots of colors as shown in FIGURE 14, Clear (294) for complete, run or pass; Red (295) for incomplete pass, Blue (296) for blocked kick or pass; Green (297) for intercepted pass.

The random appearance of these colored strips or slots in the Slot 84 in Veil 80 would result from the actuation as previously described.

The relative positioning of Veil 70 and 80 would determine where the slot would be visible and if the color strip of Veil 180 showed through this slot of light this would determine the success of the play.

Patterns, such as hatched, checkered, dots and other patterns could be used in place of colored strips.

It should be noted that this simpler version has only one set of odds. The equivalent of one line of Veil 140, for instance, Line 155.

An even simpler version of the game is not to use Veil 140 or 180 but to use the relationship, as previously described, of Veil 70 and 80 to determine the lengths of the run, pass or kick. This simplification removes some of the excitement but it is still a good game.

When this simplified version, with Veil 140 or 180 is used, and alternate method of the players changing from offense to defense and defense to offense is available. The Veils 70 and 80 can be rotated so that the portion of each now on the bottom, below the Lights 90, would be on the top when this was done, if this portion of Veil 80, which we call 80' now, showed the defensive pattern of Lines 200, 201, 202, 203, 204, 205, 206, 211, 212, 213, 214, 215, 216 and 217 and this portion of Veil 70, now called 70', now showed offensive Slot 84, the players would have changed from offense to defense and defense to offense.

In order for the veils described in this disclosure to be indexed to the proper position is relation to the detents on the drums, an indexing means between the veil and at least the one drum that has the detents can be provided. One form of such an indexing would be to have sprocket holes in the veils and sprockets on the drums.

The game of baseball is similarly constructed with moveable veils operatable by the opposing players. The results of one player's selection of plays and the opponent's counterplay is directly displayed by the computer as results of each play. The computer consists of transparent, translucent, opaque and colored areas as will be described in detail in the folowing specification.

Figures 15, 16:
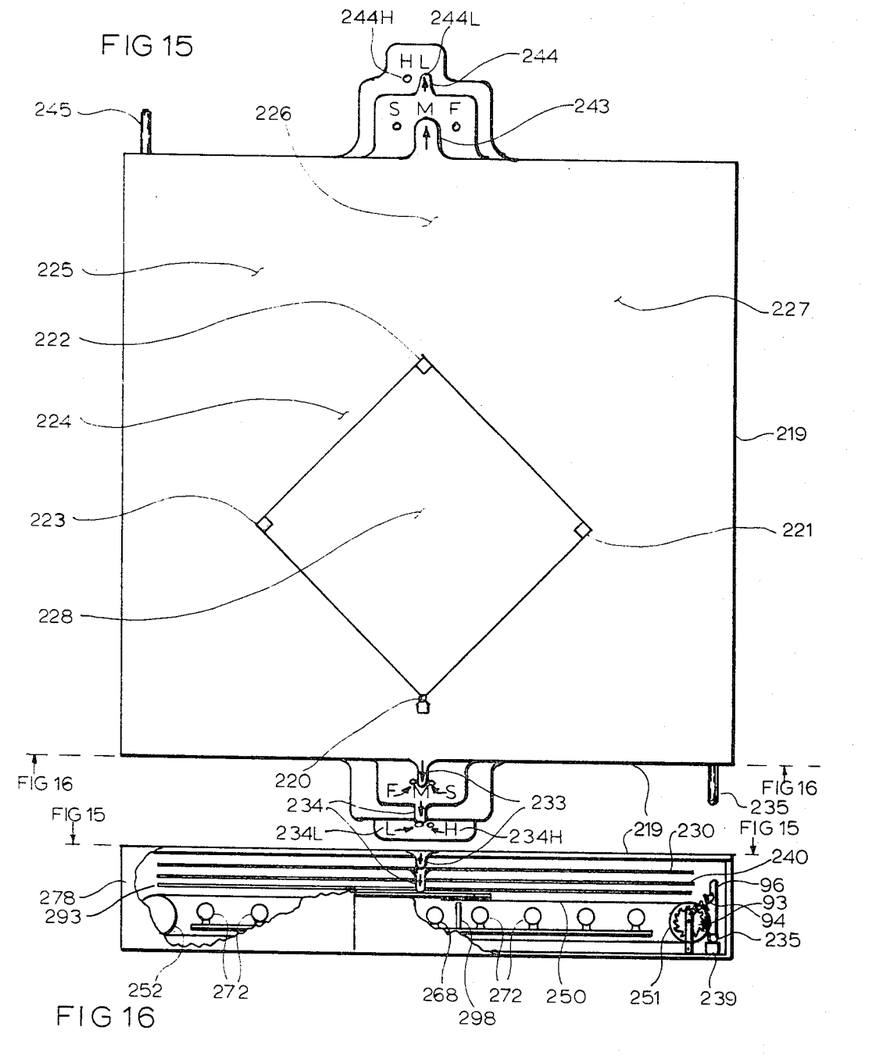
FIGURE 15 shows a plan view of the baseball version of the game.
FIGURE 16 shows an end view of the game in FIGURE 15 with a partial cutaway to show the inner workings.

The Playing Area 219 of the game as shown in a top view in FIGURE 15, consists of a layout similar to a standard baseball field, consisting of a Home Plate 220, which also can be called the Batter's Position, First Base 221, Second Base 222 and Third Base 223. Short Stop is 224 and Left Field is 225, Center Field 226 and Right Field is 227. The Pitcher position is 228.

The players can sit opposite each other, the batter next to home plate, in a position to operate Levers 233, 234 and 235 and the Pitcher sits opposite to Center Field to operate Levers 243, 244 and 245.

FIGURE 16 shows an end view of the game, looking from the batter's position. A portion of the end of Enclosure 278 is removed to show the interior.

FIGURE 16 view shows the Playing Field or Playing Area 219. The movable Veil 230, operated by the Levers 233 and 234, which are operated by the player acting as the batter. Veil 230 and Veil 240 pivot on Home Plate position 220.

Veil 240 is operated by Levers 243 and 244 which are operated by the player acting as the pitcher.

Veil 250 is a continuous veil rotating on Drums 251 and 252 which are actuated by Levers 235 and 245 in the manner to be described.

Figure 21:
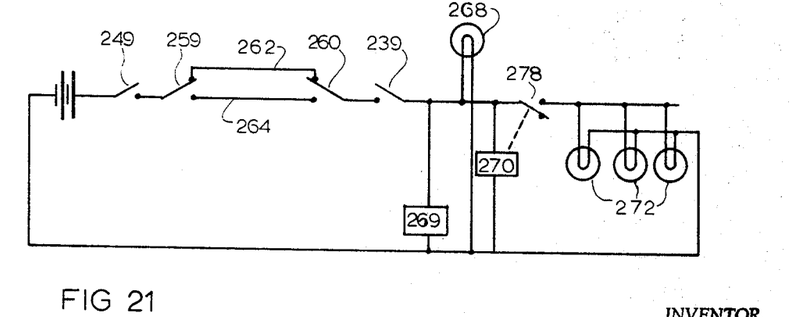
FIGURE 21 a circuit for use on the baseball version of the game.

Switch 239 is operated by the Lever 235 and Lights 272 when Switch 249 is also operated by Lever 245. This operation and the operation of Light 268 will be explained in detail elsewhere in this specification. They are shown in FIGURE 21.

An additional Veil 293 is shown in FIGURE 16. Such a veil can be adjusted by the pitcher to position his players, by the veil changing the patterns of lights, in order to have the players at positions to "catch the ball," if a hit is made in a certain direction and length. Since this veil adds complexity to the game Veil 250 has usually been found preferred.

Figure 18:
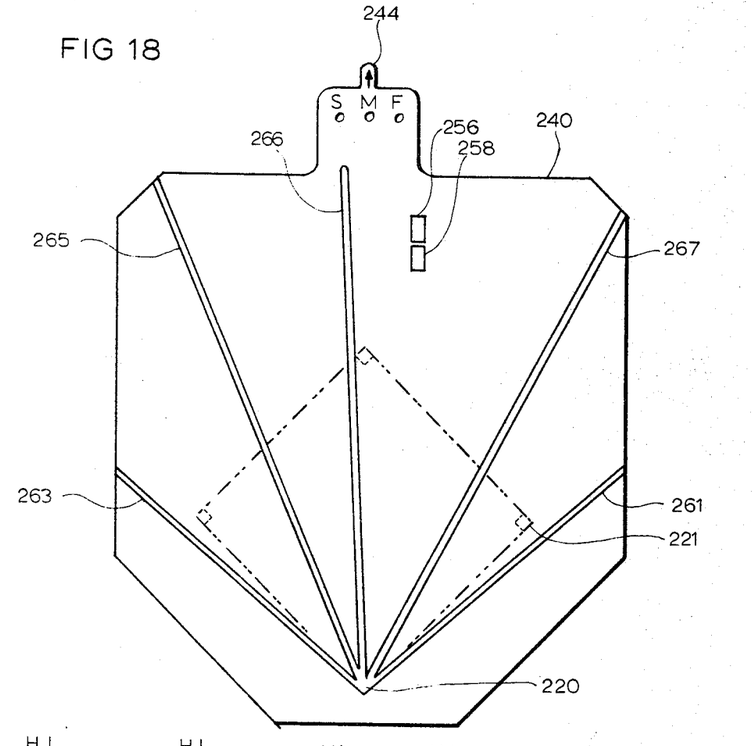
FIGURE 18 shows a plan view of veil 240 of the baseball game version. This is the pitcher's veil.

Veil 230 is shown in FIGURE 17 and Veil 240 is shown in FIGURE 18.

As previously explained, these two veils pivot on home plate position 220. The players position the Levers 233, 234, 243, 244 to select variations of the next play.

Since it is desirable to have the rules follow the baseball rules as much as possible the following principles of the game are set forth in order to point out the advantages of this invention in taking a complex set of data, rules and settings. At the flip of a lever this gives a result of the relative setting of the two players.

The principal duel is between the pitcher and the batter. For the purpose of this explanation five types of pitches have been provided for. Namely:

Fast ball, slow ball and medium speed ball, and a high pitch and a low pitch.

Again referring to FIG. 15, the pitcher's pointer 244 can be placed at positions 244L for a low pitch or at 244H for a high pitch. The batter has similar settings of pointer 234 being at 234L for hitting at a low pitch and 234H for hitting at a high pitch.

If pitcher pitches a low pitch and batter has selected to hit at a low pitch the computer readout will indicate a hit. Hitting a low ball has been reasoned and ruled to result in a long hit.

On the other hand if pitcher pitches low and batter hits high it is a miss and a strike.

If pitcher pitches a high pitch and batter hits at a high pitch it is a line drive hit of less distance than the low hit.

If, however, batter hits low at the high pitch, it is a miss and a strike.

The above hits have been described as long and the shorter line drives. The distance of the hits varies from short hits to home runs in a manner that will be explained. The direction of the hits vary in the following manner. Consider that batter has chosen a setting of lever 234 to register a hit. The direction of the hit now varies in relation to the speed of the pitch and the speed of the batter in attempting to hit the pitch. If the pitcher pitches a fast ball, by setting pointer 243 on position 243F, and if the batter sets pointer 233 on fast ball position 233F, the hit will be toward center field. This is also true if pitcher selects 243M and batter 233M for medium ball or if 243S and 233S are selected for slow balls. The reason for this conclusion is that it is reasonable to assume that the batter would hit the ball in the mid point of his swing and therefore make a straight, centrally positioned hit. Carrying this reasoning further, if pitcher pitched slow ball and batter struck for a fast ball, settings 243S and 233M respectively, the batter's swing would have been fast and he would have gone past the mid point of his swing when he hit the ball, and therefore the ball would be directed to left field.

If pitcher pitches a fast ball, setting 243F, and batter hits a low ball, setting 233M, then the opposite is true and the hit is directed to right field.

The following Chart will show this more effectively than a running explanation:

As previously done for the football version of the game the opaque areas of the veils are shown by diagonal lines. Veil 230 by diagonal lines from lower left to top right. Veil 240 by diagonal lines from top left to lower right. Where the veils opaque areas overlap the lines cross at 90°.

Figure 19A:
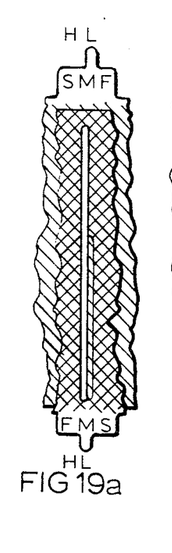
Figures 19B, 19C, 19D:
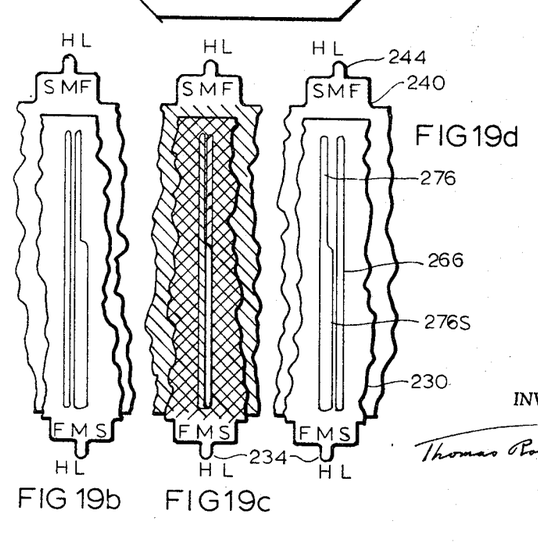

This is done on FIGURES 19a and 19c only in order to show the slots that coincide and therefore transmit light through them. The slots in FIGURES 19b and 19d do not coincide and therefore no light passes through the veils.

FIGURES 19a, 19b, 19c and 19d show the 4 possible arrangements of slots 266 and 276 or 276S resulting from settings of levers 234 and 244 when levers 233 and 243 have been both set at for M or S for a hit toward Center Field, as shown by the Chart.

These same respective settings will result from slots 265 and 275 and 275S for hits into left field from settings as per the Chart. In short FIGURES 19a, 19b, 19c and 19d represent any of the slots coinciding as per the line of hit column in the chart even though the following description speaks of only slots 266, 276 and 276S.

The item numbers as indicated in 19d are the same for FIGURES 19a, 19b and 19c.

FIGURE 19a shows the line-up of the transparent line 266 in veil 230, with transparent line 276 in veil 240 when the settings of levers 234 and 244 are as per the above Chart for a long hit.

FIGURE 19c shows the line-up of the transparent line 266 in Veil 230, with transparent line 276S when levers 234 and 244 are set for a short hit, as per the above Chart.

When lever 244 is set at 244H and lever 234 at 234L, as shown in FIGURE 19b the transparent slots in Masks 240 and 230 do not line up and not a hit is indicated.

When lever 244 is set at 244L and lever 234 is at 234H, again the transparent slots of Masks 240 and 230 do not line up, as shown in FIGURE 19d, and not a hit is indicated.

The veil 230 of FIGURE 17 is opaque except for the five slots 271, 273, 275, 276 and 277 including the short slots suffixed "S" and the two windows 255 and 257.

The Veil 240 of FIGURE 18 is opaque except for the slots 261, 263, 265, 266 and 267 and the two Windows 256 and 258.

Further variations of the pitch and batting speed, and the resultant direction of the hit can be added to this game by adding more settings to levers 243 and 233 and more transparent lines or slots in Masks 240 and 230 in the manner of this teaching.

Further elaboration can be made of the height of the pitch by adding additional settings to levers 244 and 234 in the manner of this teaching. If these additional settings are added they will likewise add settings to the following description of scoring means in a manner that will be obvious once this description is complete. For clarity this detailed description will be confined to the settings as illustrated.

The relationship between the slots in the veils shown in FIGURES 17 and 18 can vary within these limits.

The width of the slot will determine the relative movement of Veils 230 and 240 necessary to accomplish the variation in length of the slot as illustrated in FIGURE 19.

| Pitcher, lever 243 setting | Batter, lever 233 setting | Direction of hit | Line of hit in veil 230 | In veil 240 Long hit | Shorter hit |
|---|---|---|---|---|---|
| 243F | 233S | Foul on right field line | 261 | 271 | 271S |
| 243F | 233M | Right field | 267 | 277 | 277S |
| 243F | 233F | Center field | 266 | 276 | 276S |
| 243M | 233S | Right field | 267 | 277 | 277S |
| 243M | 233M | Center field | 266 | 276 | 276S |
| 243M | 233F | Left field | 265 | 275 | 275S |
| 243S | 233F | Foul on field line | 263 | 273 | 273S |
| 243S | 233M | Left field | 265 | 275 | 275S |
| 243S | 233S | Center field | 266 | 276 | 276S |

This total width of the slots in Veil 230 (see FIGURE 17), will now determine the total amount of movement of Veils 230 and 240 before any one slot in one veil begins to appear in the adjoining slot.

For instance, Slot 273S in Veil 230 can move approximately 21° before it starts to enter Slot 265 in Veil 240.

The distance between the slots must then be equal to the maximum slot width times the number of selections available that can move the slot. This spacing then would limit the number of slots.

In the game illustrated this would calculate down to a minimum value of 15° if the slots in FIGURE 17 were 3° wide (3×5=15).

Actual 18° has been allowed with the distance between slots in Veil 230 being 18° apart to add a safety measure, while the slots in Veil 240 are 21° apart to allow the proper slots to coincide to control direction of hit.

To explain further, as a Center Field Hit is made, the settings of the Chart slots 266 and 276 line up in a relationship as shown in FIGURES 19a, b, c and d.

If a Left Field Hit is made, as indicated in the Chart, the ratio of movement between Veils 230 and 240 is such that 240 moves slightly further in a relative clockwise direction, bringing Slots 265 and 275 with a coinciding condition of relationships as shown in FIGURES 19a, b, c and d, by slots 266, 276, 276S.

Again referring to the Chart, if a Left Foul Line Hit was indicated the settings would result in Veil 240 moving even further in a respective clockwise direction to bring Slots 263 and 273 into operation as per FIGURE 19, by slots 266, 276 and 276S.

The same is true regarding Right Field hits except that Veil 240 moves now in a relative counter-clockwise direction.

The further relative motion can be in either veil.

When each player has made his selections of settings of Levers 243, 244 and 233 and 234 he operates his respective Levers 245 and 235, turns on the Lights by operating Switches 249 and 239 which automatically indicates the result of the relationship of the setting of Levers 243, 244, 233 and 334 by showing no line for no hit, FIGURES 19b and 19d, a short line for a short hit FIGURE 19c, and a long line for a long hit as shown in FIGURE 19a.

Figure 20:
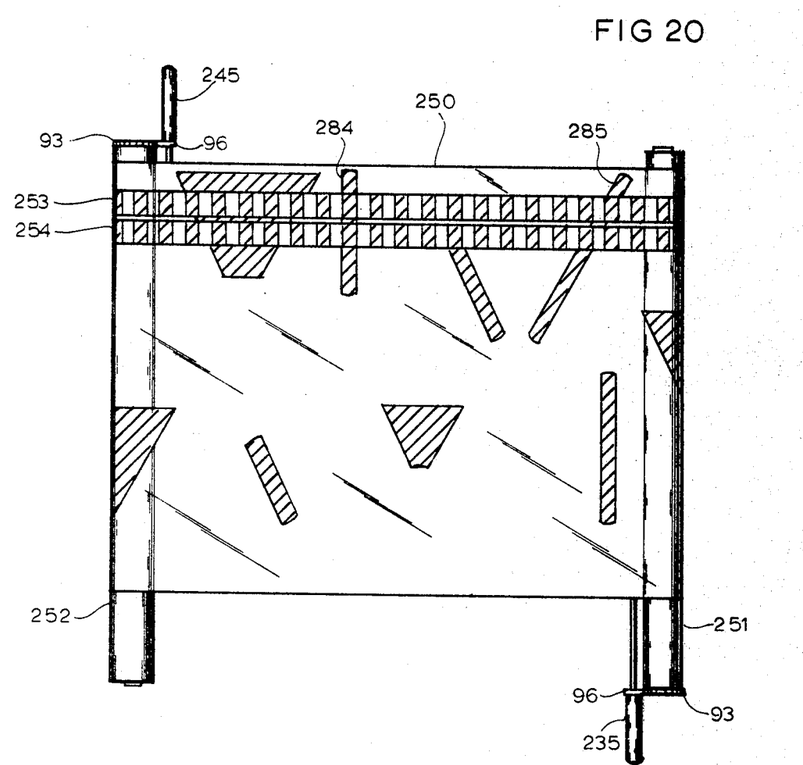
FIGURE 20 is a plan view of veil 250 showing the veil pattern for varying the length of hits as well as bearing the nomenclature.

The game can also include another Veil number 250, FIGURE 20, rolling on Drums 251 and 252 which are actuated by the operation of the Levers 235 and 245 in the manner previously described by Pawls 93, Lever 96 and Spring 94 operate. The Spring 94 is not shown in FIGURE 20.

This Veil could have a pattern such as is shown in general in FIGURE 20. The actuation of the Levers 235 and 245 would progress the Veil 250 in a random manner as previously described. The additional variation of the opaque areas in Veil 250 (shown by diagonal lines) lengthens or shortens the hits in the transparent slots in Veils 230 and 240 and would create even greater interest in the game because of the random nature of their occurrence in relation to the choice of the direction of the hit based on the skill of the players.

Veil 250 also carries lines of nomenclature such as line 253 and 254 which will appear through windows 255, 256, 257 and 258 in veils 230 and 240, for displaying such other information to enhance the game as; (1) one base hit, (2) out at first, (3) fly caught, (4) home run, (5) two base hit, (6) ball, and others.

This information would, as previously described, appear at the window position in a random fashion. Now the windows 255 in veil 230 would coincide with window 256 in veil 240 and therefore would be open to view line 253 only when a combination of settings of levers 233, 234, 243, and 244 would indicate a long hit, the indicia could be pertinent to long hits.

Nomenclature of line 254 pertain to short hits would show through windows 256 and 258 when levers 233, 234 and 243, 244 were set at short hit positions. These lever settings have been previously described.

In FIGURE 20 the indicia can be set in a vertical direction in relation to the drawing position, which is not necessary but is preferred for the advantages that movement of veil 250 can be less between settings. The subject windows, being kept narrower in this direction of movement, give better opening and closing for given movement of the veils. There is also the advantage that either player can read the lines by turning his head only 90°.

It is also preferred for this some reason that the windows be far enough from the pivot point 220 to give sufficient movement.

Every other block of nomenclature is shown opaque in FIGURE 20 to illustrate the advantage of using these opaque areas as a part of the opaque areas which control the length of the hit, such as 284 in FIGURE 20.

When an opaque area appears in the windows it could mean, "play the ball as indicated on the playing area," or the positioning of mask 250 could be to every other section in order to skip displaying the opaque blocks.

When opaque areas are broken, as where line 285 goes through lines 254 and 253 this could indicate that the ball was bouncing. This could also be the case when a hit crosses line 285 at a different angle and therefore would be broken.

The position of base runners can be with another veil, not shown in the drawings, that can pivot on the pitcher's box, Position 228, or individual men can be moved by the players.

Electrical circuits can also be combined with the game to give it even more stimulating action such as the circuit of FIGURE 21 where switch 259 is on lever 244 and 260 is on lever 234.

When levers are on high (position 244H and 234H) circuit 264 is complete, when on low position (244L and 234L), circuit 262 is complete. If one is on high and the other on low no circuit is complete.

When the circuits are complete a hit is indicated. This lights light 268, which illuminates the veils in a confined area around home plate and the first flash of light can be a sunburst effect of radiating light from the intersecting slots in 230 and 240 radiating from home plate. The light from 268 can be confined to the area desired by barriers such as 298 in FIGURE 15.

If this radiating light is combined with a sound effect 269, such as the crack of a ball on a bat, the effect to the players is the thrill of a hit. 269 can be an audio generator or a pickup and an amplifier and loud speaker.

The circuits 262 or 264 also actuates the time delay 270, that delays for a moment the closing of switch 278 and the lighting of lights 272, which builds up the anticipation of, what direction is the hit, and how far. Lights 272 light the balance of the game, showing the hit in the slots, as previously described.

The positioning of the veils by detents such as levers 233, or 243 fitting into holes marked "F," "M," or "S" or levers 234 or 244 fitting into holes marked 234L, 234H or 244L, 244H respectively as shown in FIGURES 15 and 16, is preferred in order that all areas, slots and indicia are accurately positioned at each play without the chance of being half on one or the other and raising the question of which applies.

The above described mechanism is enclosed in case 278 to enclose the lights and also to conceal the settings of the veils from the opposing player until it is time to reveal the results of these settings in one of the manners described.

The rules of the game are in general patterned along the lines of a baseball game which has published rule books available to the public. No attempt will be made to set forth here a complete set of rules for this game but the following will make this description clear.

The Batter will make hits as described. These will allow him to progress men around the bases. Each man completing the bases to home base is counted as a run. The player with the most runs at the end of the game is the winner. A game is a previously agreed number of innings, turns at bat for each player.

If 3 outs are made by the batter before a runner scores home plate no score is counted. These three outs are the end of his inning at bat.

Outs are a caught fly or strike out of 3 strikes or other nomenclature as would be displayed in the manner described.

At the end of a player's inning the opposing player now comes to bat. This is accomplished by the players changing position or by their rotating the game itself to modify their relative positions.

The transparent areas have been described as though they were areas of a solid piece of plastic or glass. They can be open space in the form of slots or areas, even in metal although this is not considered the preferred method of construction. References to transparent areas in specifications or claims will be intended to include open spaces.

The playing areas 51 and 219 are a semi-translucent material frosted just enough to prevent easy observation of the veil positions and yet not enough to blur the nomenclature from veils 140 or 250. The latitude between these extremes of translucence is wide enough not to create a problem in determining the amount of experiment and specifying an exact figure here would be wrong because this value will vary in relation to the size; type of the nomenclature on veils 140 or 250 and their placement in relation to the playing area 51 and 219.

For instance veils 140 and 250 could be the topmost elements and they would help conceal the movements of the other veils. This could be accomplished with ease by using 4 drums instead of 2, one in each corner, FIGURE 2 and FIGURE 16. These could be of less diameter, thereby using less room.

The playing areas could also be of a color, such as blue, that would restrict viewing into the "dark" interior of the enclosure but would readily transmit light out.

These playing areas can also be similar to a one way mirror in that the light can come out of the enclosures but the players can't look into them when the lights aren't on.

Another way of using the invention is to have a cover or veins to obstruct the observing of the interior. These would be removed by the players when they operated the levers after the setting of the plays, and would open or allow the opening of this cover to view the results of the computer.

If a center white veil were placed where the lights are in these drawings, lights would not be necessary, as light entering the now transparent playing areas 51 or 219 would reflect from the white veil and indicate the results of the settings of the opaque or black areas of the veils as described in this specification.

Other colors can be used rather than black and white.

I claim:

1. A game comprising a cabinet; two superposed play selecting means adapted to be moved in a concealed manner within said cabinet to a position relative a strategic game play; one of said play selecting means comprised of an opaque surface having an offensive pattern area thereon permitting passage of light therethrough, one of said play selecting means comprised of an opaque surface having a defensive pattern area thereon permitting passage of light therethrough; the arrangement of said pattern areas being such that one of a plurality of different possible play results will be selected depending upon the relative positioning of said defensive pattern and said offensive pattern; a chance mask comprising an endless belt containing randomly positioned indicia and located below said play selecting means; chance selecting means adapted to randomly position said chance mask; and illuminating means positioned beneath said means and adapted to illuminate a single play result through the aligned portions of said light-transmitting areas of said play selecting masks and said chance means.

2. The game as recited in claim 1 wherein said play selecting means have additional light-transmitting areas through which an indicium on said chance mask is illuminated at the end of a play, the indicium representing the play result as a function of at least the probability of the successful completion of the play.

3. The game as recited in claim 2 wherein said indicia are arranged on said chance mask in a preselected arrangement with respect to said light-transmitting areas on said play selecting means so that the probability of successfully completing a play is a function of the relative positioning of said defensive pattern with respect to said offensive pattern.

4. The game as recited in claim 3 wherein said chance mask further includes indicia related to various rules of said game, whereby the indicium illuminated at the end of a play may further represent the play result as a function of the game's rules.

5. The game as recited in claim 3 wherein said chance selecting means include means for advancing said chance mask from one position to another as a function of the time between the selection of the positions of said play selecting mask.

6. The game as recited in claim 3 further including a field-representing member, and means for selectively positioning said member with respect to said cabinet, whereby the play progress is directly indicative thereon.

7. The game as recited in claim 6 wherein said chance mask further includes indicia related to various rules of said game, whereby the indicium illuminated at the end of a play may further represent the play result as a function of the game's rules.

8. The game as recited in claim 7 wherein said game is American football, further including means for separately moving said offensive pattern and said defensive pattern to positions related to any one of the possible pass or run plays.

9. The game as recited in claim 8 wherein said offensive pattern area comprises a single elongated light-transmitting area and said defensive pattern area comprises of surface areas representing a defensive center, two guards, two tackles and two ends.

10. The game as recited in claim 7 wherein said game is baseball, said play selecting means being separately positionable to correspond to any one of a plurality of pitches of different speeds and pitch directions.

11. A game comprising:
a cabinet;
a first offense play selecting member having a substantially opaque surface except for light-transmitting area defining an offensive pattern permitting passage of light therethrough;
a first actuable position control means for concealably moving, within said cabinet, said first member to a selected offensive position;
a second defense play selecting member having a substantially opaque surface except for light-transmitting area defining a defensive pattern permitting passage of light therethrough;
a second actuable position control means for concealably moving, within said cabinet, said second member to a selected offensive position;
illuminating means positioned within said cabinet with respect to said first and second members, whereby light is transmitted only through the superposed light-transmitted areas of the offensive and defensive patterns to represent a play result;
indicia-carrying means randomly positioned for displaying a single indicium representing the probability of successful completion of the play resulting from the relative superposition of said offensive and defensive patterns; and chance indexing means adapted to randomly position said indicia carrying means.

12. The game as recited in claim 11 wherein each of said offensive and defensive play selecting members further define additional light-transmitting areas and said indicia-carrying means is positioned with respect to said members and said illuminating means so that a single indicium is illuminated through said additional light-transmitting areas of said play selecting members.

13. The game as recited in claim 12 wherein said indicia include indicia representing game penalties.

14. The game as recited in claim 12 further including a field-defining member, and means for positioning said field-defining member on said cabinet to display the progress of the game from play to play.

References Cited
UNITED STATES PATENTS

| | | | |
|---|---|---|---|
| 557,646 | 4/1896 | Booth | 273—134 |
| 2,149,363 | 3/1939 | Rivkin | |
| 2,180,478 | 11/1939 | Pekalski | 273—94 |
| 2,260,467 | 10/1941 | Le May | 273—94 |
| 2,774,598 | 12/1956 | Strocco | 273—136 |
| 3,127,174 | 3/1964 | Ryan | 273—130 |
| 2,780,461 | 2/1957 | Ryan | 273—94 |
| 3,046,015 | 7/1962 | Schuh | 273—94 |
| 3,231,276 | 1/1966 | Cooper | 273—94 |

LOUIS G. MANCENE, *Primary Examiner.*

S. NATTER, *Assistant Examiner.*